United States Patent [19]
Vig

[11] Patent Number: 5,686,779
[45] Date of Patent: Nov. 11, 1997

[54] HIGH SENSITIVITY TEMPERATURE SENSOR AND SENSOR ARRAY

[75] Inventor: John R. Vig, Colts Neck, N.J.

[73] Assignee: The United States of America as represented by the Secretary of the Army, Washington, D.C.

[21] Appl. No.: 397,698

[22] Filed: Mar. 1, 1995

[51] Int. Cl.$^6$ .................... G01K 11/26; G01K 7/32; H01L 41/04
[52] U.S. Cl. ............................ 310/366; 310/311
[58] Field of Search .................... 310/309, 320, 310/338, 348, 360, 361, 365, 366; 374/117

[56] References Cited

U.S. PATENT DOCUMENTS

| | | | |
|---|---|---|---|
| 2,497,275 | 2/1950 | Samuelson | 310/360 |
| 3,911,444 | 10/1975 | Lou et al. | 346/1 |
| 3,969,640 | 7/1976 | Staudte | 310/360 |
| 3,974,405 | 8/1976 | Schussler et al. | 310/360 |
| 4,039,969 | 8/1977 | Martin | 310/361 |
| 4,109,173 | 8/1978 | O'Connell | 310/360 |
| 4,135,108 | 1/1979 | Besson | 310/344 |
| 4,398,115 | 8/1983 | Gagnepain et al. | 310/313 A |
| 4,472,656 | 9/1984 | Franx | 310/361 |
| 4,592,663 | 6/1986 | EerNisse et al. | 374/117 |
| 4,692,654 | 9/1987 | Umemura et al. | 310/334 |
| 4,701,661 | 10/1987 | Warner et al. | 310/360 |
| 4,754,187 | 6/1988 | Kosingki | 310/361 |
| 4,755,314 | 7/1988 | Sakaguchi et al. | 310/360 |
| 4,760,351 | 7/1988 | Newell et al. | 331/48 |
| 4,772,130 | 9/1988 | Ueda et al. | 374/117 |
| 4,861,168 | 8/1989 | Ziegler et al. | 374/117 |
| 4,872,765 | 10/1989 | Schodowski | 374/117 |
| 4,874,252 | 10/1989 | Ziegler et al. | 374/117 |
| 4,987,579 | 1/1991 | Yoshinaka et al. | 377/25 |
| 4,990,818 | 2/1991 | Ballato et al. | 310/360 |
| 5,041,800 | 8/1991 | Long et al. | 331/69 |
| 5,149,197 | 9/1992 | Rokos et al. | 374/117 |
| 5,189,914 | 3/1993 | White et al. | 73/599 |
| 5,198,716 | 3/1993 | Godshall et al. | 310/361 |
| 5,233,259 | 8/1993 | Krishnaswamy et al. | 310/365 |
| 5,339,051 | 8/1994 | Koehler et al. | 310/318 |
| 5,389,218 | 2/1995 | Bonne et al. | 204/153.18 |
| 5,463,277 | 10/1995 | Kimura et al. | 310/336 |
| 5,464,966 | 11/1995 | Gaitan et al. | 215/544 |
| 5,495,135 | 2/1996 | Zimnicki et al. | 310/312 |
| 5,512,836 | 4/1996 | Chen et al. | 324/687 |
| 5,519,279 | 5/1996 | Zimnicki | 310/363 |
| 5,521,123 | 5/1996 | Kamatsu et al. | 437/209 |
| 5,548,178 | 8/1996 | Eda et al. | 310/349 |

OTHER PUBLICATIONS

W.H. Wade et al, "Quartz Crystal Thermometer", The Review of Scientific Instruments, vol. 33, No. 2, pp. 212–213, Feb. 1962.

W.L. Smith et al, "Quartz Crystal Thermometer for Measuring Temperature Deviations in the $10^{-3}$ to $10^{-6}$ °C. Range", The Review of Scientific Instruments, vol. 34, No. 3, pp. 268–270, Mar. 1963.

D.L. Hammond et al, "A Linear, Quartz–Crystal, Temperature–Sensing Element", ISA Transactions, pp. 349–354, vol. 4, No.4, Oct. 1965.

Primary Examiner—Thomas M. Dougherty
Attorney, Agent, or Firm—Michael Zelenka; William H. Anderson

[57] ABSTRACT

A highly sensitive thermal sensor is disclosed which uses a thermally isolated, thermometer cut quartz microresonator that is configured to be exposed to a radiant energy source.

3 Claims, 3 Drawing Sheets

FIG. 1A
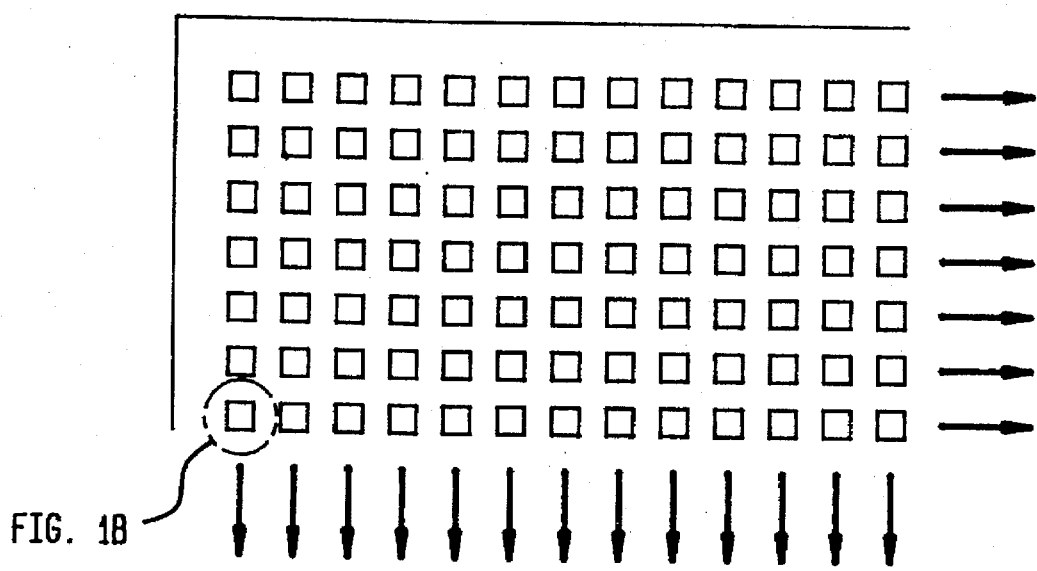
FIG. 1B
FIG. 1B
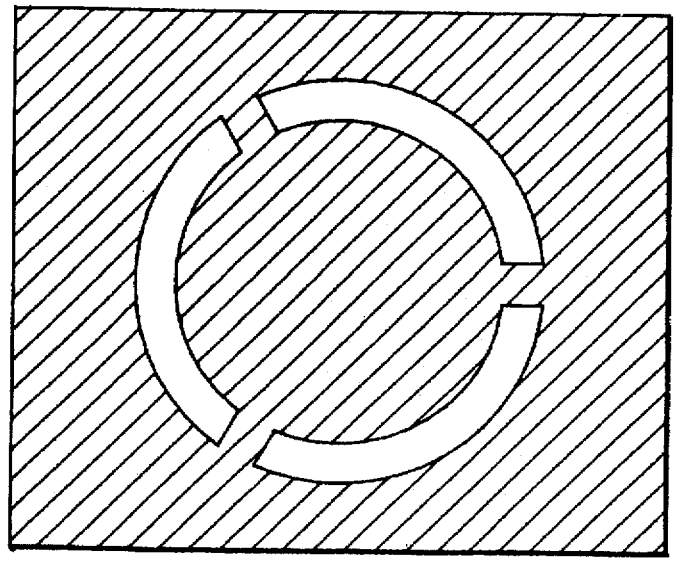

HIGH SENSITIVITY TEMPERATURE SENSOR AND SENSOR ARRAY

GOVERNMENT INTEREST

The invention described herein may be made, used, sold and/or licensed by, or on behalf of, the United States of America without the payment to me of any royalties thereon.

FIELD OF THE INVENTION

The present invention relates to the field of quartz resonators that are designed to sense various physical parameters, such as pressure, temperature and acceleration, and more particularly to a quartz microresonator that is highly sensitive to temperature changes, wherein the temperature changes result from absorption of radiant energy.

BACKGROUND OF THE INVENTION

It is general knowledge that quartz crystal resonators are sensitive to temperature as well as other physical conditions. Quartz based thermometers have been known since, at least, 1962–1963 as evidenced by such publications as W. H. Wade et al, "Quartz Crystal Thermometer," Rev. Sci. Instr., Vol. 33, pp. 212–213, 1962; and Smith et al, "Quartz Crystal Thermometer for Measuring Temperature Deviations in the $10^{-3\circ}$ to $10^{-6\circ}$ C. Range, Rev. Sci. Instr., Vol. 34, pp. 268–270, 1963. These publications show that thermometers based on quartz resonators can detect temperature changes of microkelvins.

In particular, it has been known for some years that high stability oscillators are subject to temperature effects that perturb their accuracy. Moreover, at present, one of the highest performance temperature measuring instruments relies on methods that cause the frequency of an oscillator to vary with temperature.

Since quartz is anisotropic, crystal cut orientations can be found to minimize, or alternatively, to selectively increase sensitivity to temperature. A quartz orientation that can be used to produce plates with a linear temperature coefficient over a wide temperature range is described by D. L. Hammond, C. A. Adams & P. Schmidt in a paper entitled "A linear quartz crystal temperature sensing element" given at the 19th annual conference of the ISA in October 1964. This bulk wave quartz cut, known as the LC (Linear Coefficient) cut, has been used to make a quartz thermometer by inserting the plate in an amplified loop to obtain an oscillator whose frequency varies linearly with temperature (D. L. Hammond &. A. Benjaminson in "Unthermometre lineaire a quartz" (A linear quartz thermometer), in the February 1966 issue of the journal "Mesure"). Measurements could be performed automatically with a resolution of $10^{-4\circ}$ C. over a temperature range of −40° C. to +230° C. A major drawback of such a thermometer is that its response time is about 10 seconds, which is due to the fact that the bulk wave quartz plate is held by three fixing points which are the seat of the main heat exchangers. The sensitivity of this probe is about $35 \times 10^{-6\circ}$ C., which corresponds to a frequency variation of $10^3$ Hz/°C. at an operating frequency of 28 MHz (3rd overtone).

An improvement to this type of temperature sensor was described in U.S. Pat. No. 4,398,115, issued to Gagnepain et al on Aug. 9, 1983, and entitled, "Temperature probe using a plate of quartz." This patent discloses a modified and specially cut quartz crystal plate which is used to determine the frequency of a frequency generator wherein the frequency determined by the quartz plate is variable as a function of temperature. The quartz plate constitutes the substrate for a surface acoustic wave device, e.g. a resonator or a delay line using comb transducers. The special orientation in the quartz crystal of the plane over which the acoustic wave propagates, and the direction of propagation in the plane are defined in terms of a doubly rotated frame. This cut, however, is difficult to fabricate on a large scale and cannot be used in thermal imaging arrays due to its size.

Other prior art includes high sensitivity infrared detectors, such as those based on mercury-cadmium-telluride materials or those based on superconducting materials. However, these types of detectors often need cryogenic cooling, are difficult to manufacture, have reliability problems, use environmentally unsafe materials, and are expensive.

SUMMARY OF THE INVENTION

Accordingly, it is a general objective of the present invention to provide a low cost, highly sensitive radiant energy sensor, or thermometer, or thermal imaging device based on quartz microresonator technology which can be readily incorporated into an array of a large number of pixels.

Another objective of the present invention is to provide a temperature sensor which detects changes in temperature very rapidly and with a high detectivity.

A further objective of the present invention is to provide such a sensor which is still sensitive to minute changes in temperature, but which can survive high acceleration levels.

These and other objects of the present invention are accomplished by the use of a thermally isolated, thermometer cut quartz crystal microresonator which is configured to be exposed to a radiant energy or heat source or a source in which there is a change in temperature. For purposes of this invention, the term microresonator shall mean a resonator which has a relatively minute size, for example, having a length and width of 50 μm and a thickness of 1 μm. Further, the term, "thermometer cut crystal," shall mean that the crystal is cut such that its angles of cut provide a frequency versus temperature characteristic which is steep and monotonic over the temperature range of interest. Furthermore, the term, "radiant energy," means any type of radiation in the electromagnetic radiation spectrum that will raise the temperature of a resonator according to the present invention. The types of radiation that may be detected by the present invention include gamma rays, x-rays, ultraviolet light, visible light, infrared radiation, and microwave or millimeter wave energy.

The microresonator according to the present invention may be a singly or doubly rotated cut crystal, and its mode of excitation may be single mode or dual mode. In a dual mode excitation, a temperature sensing beat frequency is derived from two simultaneously excited modes, such as from the fundamental mode and the third overtone of an SC-cut crystal. Of course, as those skilled in the art will readily recognize, a single mode of excitation will reduce the necessary circuitry. However, depending on the application of the sensor a dual mode excitation may be advantageous. The crystal used in the microresonator of the present invention must be cut such that it has a steep and monotonic frequency versus temperature characteristic. For example, these cuts may include the Y-cut, AC-cut, BC-cut, LC-cut, NLSC-cut, and SC-cut. An SC-cut's b-mode, or the beat frequency derived from its fundamental mode and third overtone frequencies can be used as temperature sensing frequencies.

The microresonator must also be thermally isolated. This can be accomplished in several ways, for example, grooves can be etched around the resonator, thermal isolation rings can be formed around the resonator itself, or thin film or aerogel supports can hold the microresonator in place.

Further, the microresonator must be either directly exposed to the radiant energy source or have some means to direct the radiant energy to its absorbing surfaces. This means that only certain electrode configurations may be used. For example, in an electrodeless, or "BVA" configuration, a ring electrode is deposited on an infrared transmitting material on the side facing the radiant energy source such that the ring electrode and an infrared transmitting window is separated from the microresonator by a small gap. The ring electrode allows the radiant energy to pass through to the microresonator. Also separated by a small gap from the microresonator and on the opposite side is a second electrode which can be a ring electrode or an electrode of conventional design. A lateral field resonator electrode configuration may also be used wherein the two electrodes are placed on the bottom surface of the crystal and the microresonator is excited laterally. Therefore, the entire top surface can be used to absorb the incident radiant energy.

In operation, the desired mode of the microresonator is excited by means of low-power oscillator circuitry. Because the microresonator is small in mass and heat capacity and because the crystal of the microresonator is designed to have a steep and monotonic frequency versus temperature characteristic, minute amounts of incident radiant energy changes the temperature of the microresonator and thus, changes the output frequency. Any change in temperature can be readily calculated from the change in frequency output.

Such a microresonator can be configured into an array of "pixels" to provide a thermal imager. Because quartz plates as large as 10 cm×10 cm are commercially available, very large arrays are possible. Using the example dimensions given above (50 μm square), an array having 2,000×2,000 pixels per wafer is anticipated by the present invention. Such an array has several advantages over current state of the art thermal imagers based on mercury-cadmium-telluride detectors or other photon or thermal detectors. First, the thermal mass of a pixel according to the present invention will only be approximately $5 \times 10^{-9}$ J/°K., and the weight of each pixel only 7 nanograms. Second, no direct electrical contact may be needed and therefore, the heat losses via thermal conduction can be reduced to below the losses due to radiation, which is approximately $3 \times 10^{-8}$ W/°K. per pixel at 300° K. Third, this array will be highly resistant to shock because the microresonators are produced by etching techniques which produce flawless surfaces. Resonators which are very thin and which possess flawless surfaces have been found to be capable of surviving extremely high shocks. It is anticipated that the present arrays can survive a shock of approximately 100,000 g. Fourth, the thermal imager of the present invention is inherently digital.

Therefore, a high detectivity temperature sensor element is anticipated by the present invention which has the following preferred characteristics: 1) the resonator is small so as to have a very small heat capacitance; 2) the resonator's frequency versus temperature characteristic is steep and monotonic over the temperature range of interest; 3) the resonator exhibits low noise so as to allow a high signal to noise ratio even for small temperature changes, that is, so that a small frequency change (due to a small temperature change) can be resolved; 4) the resonator is thermally isolated from its heat sink while allowing a path for radiant energy to impinge upon the radiant energy absorbing parts of the resonator; 5) the resonator has a small thermal time constant; and 6) the resonator is made of, or is coated with, a thin film of radiant energy absorbing material.

BRIEF DESCRIPTION OF THE DRAWINGS

These and other features of the present invention will become readily apparent in light of the following Detailed Description of the Present Invention and the attached drawings wherein:

FIGS. 1A and 1B illustrate a top view of an electrode configuration for one electrodeless embodiment of the present invention and the microresonators incorporated into a sample array;

Figure 2A:
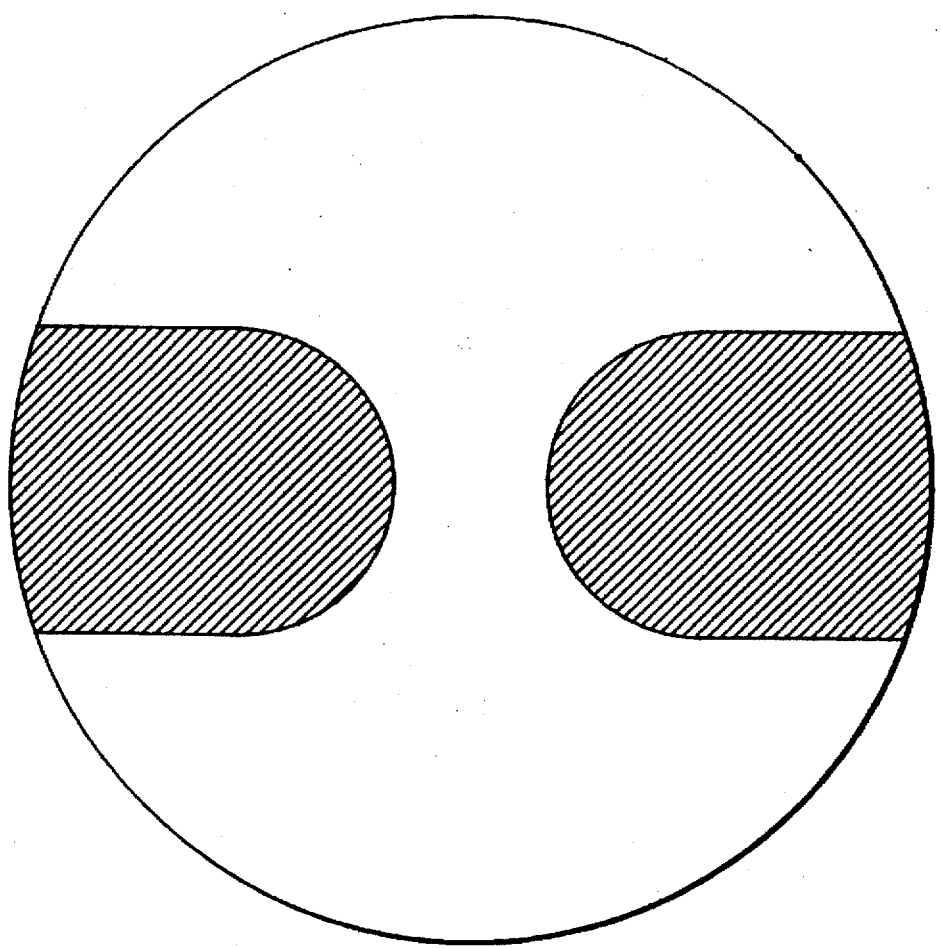
FIGS. 2a and 2b illustrate top and cross-section views of a second electrode configuration according to the present invention.

It should be noted that for purposes of illustration some of the features of the present invention have not been drawn to scale. However, the examples of preferred dimensions are given in the Detailed Description of the Invention.

DETAILED DESCRIPTION OF THE INVENTION

In its most generic embodiment, the present invention comprises a thermally isolated, thermometer cut quartz crystal microresonator which is configured to be exposed to a radiant energy source or a source which causes a change in the microresonator's temperature.

The microresonator according to the present invention may be a single or dual mode crystal, but the crystal must be cut and excited such that it has a steep and monotonic frequency versus temperature characteristic and has a well behaved temperature sensitive mode. As mentioned above, this characteristic for purposes of this invention will be referred to as a thermometer cut crystal.

The types of quartz crystal cuts which may be used for the present invention include the Y-cut, AC-cut, BC-cut, LC-cut, NLSC-cut, SC-cut, or any other cut that can be manufactured to be very thin and have a well behaved temperature sensitive mode. Further, an SC-cut's b-mode, or the beat frequency derived from its fundamental mode and third overtone frequencies can be used as temperature sensing frequencies. The above-mentioned cuts typically have frequency vs. temperature slopes of 20 ppm/°K. to 90 ppm/°K. (that is, 32 kHz/°K. to 140 kHz/°K. at 1.6 GHz). For example, a Y-cut or an AC-cut can provide a single mode with a steep frequency versus temperature characteristic; an AC-cut has a slope of +20 ppm/°C. and a Y-cut crystal has a slope of +90 ppm/°C. For a dual mode SC-cut resonator, a typical slope of the beat frequency versus temperature is 80 ppm/°C., but this slope can be varied over a wide range by varying design parameters, such as the electrode dimensions. A slope as high as 150 ppm/°C. has been achieved. Therefore, because the frequency versus temperature characteristics of different cuts vary greatly, the type of cut used for particular applications will greatly depend upon the sensitivity required and the ease of design and fabrication.

As those skilled in the art will also recognize, temperature sensing resonators according to the present invention can be made of piezoelectric or dielectric materials other than quartz. For example, langasite, lithium tetraborate, berlinite, lithium niobate, lithium tantalate, zinc oxide, gallium phosphate, gallium arsenide, aluminum nitride, ceramics, silicon, etc, may all be used. Sapphire resonators can provide higher Q and lower noise than quartz resonators of the same frequency.

With respect to the dimensions of the resonator, the diameter to thickness ratios of the various cuts are important. It is also important that the two major surfaces of the resonator be parallel. For example, while a flat AT-cut requires a diameter to thickness ratio of about 80, an SC-cut as well as other cuts only require a ratio of about 30 to 50. A specific example of a resonator which may be used in the present invention would be a 1.6 GHz SC-cut or AC-cut resonator having a thickness of 1 µm. Using such a resonator, a 40,000/cm$^2$ "pixel" array can be formed on a single quartz wafer while still maintaining a diameter to thickness ratio of 50. In such an array, each "pixel" would have dimensions equal to 50 µm×50 µm×1 µm. As those skilled in the art will recognize, 10 cm×10 cm wafers are currently available and accordingly, arrays of up to 2,000× 2,000, or 4 million pixels, would be possible, in principle. Moreover, using higher frequency resonators, larger numbers of pixels would also be possible. For example, at 3.2 GHz, 4 times as many resonators could be accommodated.

Because the resonators used for purposes of this invention are small, it will be most advantageous to form the resonators using photolithographic techniques, such as those used in the microelectronics industry. Using such techniques, then, the resonators may take on a variety of shapes including circular, elliptical, rectangular, hexagonal, etc. In addition to using etching processes, epitaxial growth techniques may also be employed followed by etching away some or all of the substrate in order to form an array of thin microresonators.

Now considering the sensitivity of the present invention, the steady-state temperature response of any thermal detector may be given by the following equation:

$$\Delta i\ T = P/G$$

where P is the absorbed power from the radiation source, $\Delta T$ is the temperature rise due to P, and G is the thermal conductance between the sensitive element (detector) and a heat sink at temperature T. The degree to which the $\Delta T$ can be resolved depends on the noise of the detector element relative to the signal produced by $\Delta T$. The use of low-noise microresonators and low-noise circuitry is, therefore, advantageous.

The time constant $\tau$ of the detector element is given by the equation:

$$\tau = C/G$$

where C is the heat capacity of the element. Therefore, for best performance, the element for any thermal detector should have a small G and a small C/G ratio.

Considering these qualities for the present invention, it is known that the heat capacity of quartz ranges from $111\times10^{-3}$ cal/g at $-100°$ C. to $204\times10^{-3}$ cal/g at $+200°$ C., and $270\times10^{-3}$ cal/g at $+400°$ C. and the thermal conductivity of quartz ranges from 0.117 cal/cm/s/°C. parallel to the Z axis and 0.0586 cal/cm/s/°C. perpendicular to the Z axis, at $-190°$ C., to 0.0215 and 0.0133 at $+100°$ C. (1 cal/sec=4.184 watt-sec=4.184 joules). Therefore, at a temperature of 300° K. and using the 1.6 GHz SC-cut dual mode microresonator mentioned above, the increase in radiant heat loss due to a temperature rise is $7.84\times10^{-8}$ watt/°K. and the thermal time constant for the radiant heat loss is 0.17 second. In order to achieve the highest detectivity, the microresonators according to the present invention must be thermally isolated to make the thermal conductance through the supports negligible. This requires that the microresonators be in a vacuum or a low pressure environment. However, for imaging applications, a shorter thermal time constant is more desirable than the time constant one obtains when heat is lost from the microresonators by radiation only. In order to reduce the microresonator's thermal time constant, it is necessary to reduce C/G. For example, this may be accomplished by allowing a small amount of thermal conductance through the supports, or through a low pressure of gas such as helium surrounding the microresonators. The helium gas method is preferred because this method allows for precise control and variation of the thermal time constant.

In order to achieve the highest signal to noise ratio with the shortest measurement time capability, a measurement time $\tau$ should be selected at the "knee" of the two-sample deviation $\sigma_y(\tau)$ vs. $\tau$ curve and should be averaged over multiple measurements. The "knee" of the $\sigma_y(\tau)$ vs. T curve is the lower end of the "flicker floor," i.e. it is the point where the curve turns up and the white phase noise takes over from flicker of the frequency region.

As mentioned above, a dual-mode, SC-cut resonator has a typical beat frequency vs. temperature slope of 80 ppm/°C., which, for example, equates to 14 Hz/°C. at a 172 kHz beat frequency when the resonator is at 10 MHz in the third overtone and at 3.3 MHz in the fundamental mode. At a constant temperature, the resolution of the beat frequency measurement is limited by the resonator's short term stability or noise, $\sigma_y(\tau)$. The minimum short term stability, $\sigma_y(\tau)$, of a 1.6 GHz bulk acoustic wave (BAW) resonator has been estimated to be approximately $10^{-10}$ to $10^{-9}$. If a measurement time for the present invention is set at the "knee" of the $\sigma_y(\tau)$ vs. $\tau$ curve, the measurement time $\tau$ would be at approximately $10^{-4}$ s. Using this measurement time and assuming the micro-resonators remain stable as a function of environment for 1 second, 10,000 measurements can be made at $\tau=100$ µs. Therefore, in a scanning configuration, if switching to the next pixel and measuring the frequency is done, for example every 100 µs, one oscillator can excite 10,000 resonators per second. The methods of excitation include exciting all resonators simultaneously, with one oscillator per microresonator, or exciting resonators by scanning, that is, with one oscillator exciting a multiplicity of microresonators sequentially. When the array consists of a large number of pixels, or when power availability is limited, the scanning method is preferred. A large array can, for example, be divided into subarrays with one oscillator exciting the microresonators in each subarray.

Of course, as those skilled in the art will readily recognize, 1.6 GHz resonator arrays as described above are difficult to fabricate with currently available materials and fabrication methods. Until better materials and fabrication methods become available, thicker microresonators, for example, 500 MHz microresonators may also be used according to the present invention and will make the present invention much easier to fabricate as well as reduce the noise. Microresonators of up to 30 µm may be utilized in the present invention. Compared with the 1.6 GHz example, the pixels for a 500 MHz embodiment would be about three times thicker and nine times greater in area. For example, at 500 MHz, a pixel's dimensions will be 150 µm×150 µm×3 µm and therefore, 4,400 pixels per cm$^2$ are possible. Using the calculations above, the thermal resolution of the a 500 MHz array would be approximately 100 nanokelvins.

Although 500 MHz and even lower frequency microresonators are adequate for many applications, the performance capability of the microresonators improve when the frequencies are higher, e.g., 3.2 GHz microresonators will eventually be preferred to 1.6 GHz, once 3.2 GHz microresonators become manufacturable. At 3.2 GHz, for example, the thickness of an SC-cut microresonator is about 0.5 µm.

Referring now to FIG. 1, there is shown one electrode configuration for an embodiment of the present invention. FIG. 1 shows a configuration for a thickness field resonator with a ring electrode on the front side of a crystal and a solid electrode on the back side (not shown). Other electrode configurations are also possible so long as one surface of the crystal is exposed to the radiant energy source. These other configurations for thickness field resonators would include solid electrodes on a back side of the crystal and thin interconnected concentric rings or thin interconnected strips of the top surface of the crystal. These configurations actually would be preferred over the ring configuration of FIG. 1 because these configurations would more closely approximate a solid electrode and therefore, would reduce the impedance mismatching caused by the different electrode shapes. These different electrode configurations could be easily duplicated utilizing standard photolithography and etching procedures.

Figure 2B:
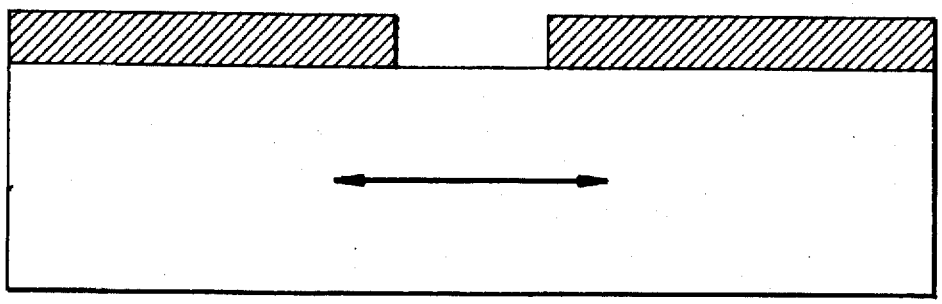

As shown in FIGS. 2a–2b, a lateral field resonator may also be employed in the present invention. FIGS. 2a–2b show that using lateral field excitation, according to one embodiment of the invention, only one side of the crystal needs to have electrodes, leaving the entire surface of the opposite side to be exposed to incident radiation. A lateral field resonator would allow the crystal itself to contribute to the absorption for detecting the radiation wavelengths that the particular crystal absorbs. Further, a lateral field resonator could be coated on one side with the necessary two electrodes and the other side could be coated with an ultrathin absorbing thin film that would face the incident radiation. Furthermore, the resonator's energy trapping can be aided by either recessing the electrodes into the crystal substrate or by creating mesas in the crystal substrate.

One method of fabricating the resonators is to etch the resonators such that the center portions are slightly thicker than the rest. This mesa formation would provide the necessary energy trapping. An example of dimensions for this would include a diameter for the central mesa to be equal to the diameter of the outer edge of the ring electrode (mentioned above in FIG. 1) and the thickness of the mesa would be about one fiftieth of the plate thickness, that is, for a one micrometer thick microresonator, the mesa height would be only about 20 nanometers.

Another means for energy trapping would be to deposit a thin film of radiant energy absorbing material over the active area, for example, in the shape of a mesa. A wide variety of radiant energy absorbing coatings are available. For example, when the radiant energy to be sensed is infrared radiation, thin films of nichrome, aluminum, copper, molybdenum, platinum black, or black gold can be used. The thin film can be of any material, as long as the sheet resistance of the film is about 188 ohms per square, that is, one half of the impedance of free space. Such films absorb 50 percent of the incident infrared radiation. For example, 8 nm of vacuum evaporated nichrome or 17 nm of gold can provide such film resistance. For the thinnest possible resonator, a sheet resistance of about 188 ohms per square aluminum, or copper are preferred. The absorption can be increased to greater than fifty percent by creating multiple passes of the infrared radiation through the resonator, e.g., by having an antireflection film on the front of the enclosure and a reflecting film on the back side. Making the enclosure into a resonant optical cavity may be a preferred solution when the film needs to absorb only a limited range of wavelengths of incident radiation as this would allow even thinner absorbing films, and thus a higher frequency, and higher detectivity detector. A three layer absorber stack consisting of a metal thin film of 377 Ω/square on the side facing the infrared radiation, a dielectric layer of refractive index n and thickness $d=\lambda_{max}/4n$, and an infrared reflecting film on the back side has been shown to be capable of greater than 95% absorption at the wavelength $\lambda_{max}$. Therefore, such layering would be beneficial for a preferred embodiment of the present invention. For any absorbing thin film, however, the film thickness must be controlled precisely to obtain the maximum absorption. This precise control can be achieved with known methods by monitoring the frequencies of resonators during deposition or by monitoring infrared transmission with a light emitting diode on one side and a photodetector on the other side of the resonator.

Figure 3:
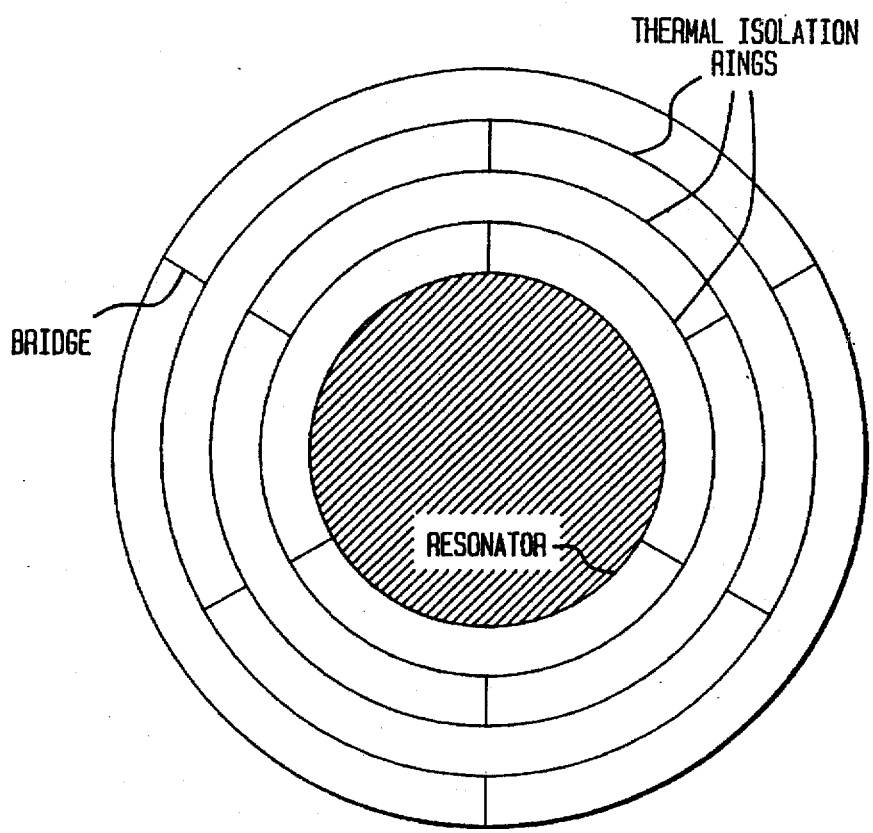
FIG. 3 illustrates one way in which to thermally isolate the microresonator according to the present invention.

Another requirement of the present invention is that the active area of the resonator must be thermally isolated. One way to thermally isolate the active areas is shown in FIG. 3, wherein the microresonator includes a plurality of concentric low thermal conductance rings and a plurality of sets of bridges each set of bridges connecting a selected pair of concentric rings. This configuration extends the thermal conduction path length. As shown, concentric rings are etched around each resonator and are connected, for example, by a set of three evenly spaced bridges which are each separated by 120° such that the bridge sets are offset from each other by 60°. With this configuration, the heat conduction must travel through a bridge around two 60° arcs before passing to the next ring. For a resonator diameter D, each 60° arc is πD/6 long. If the bridges' length=b and the arc length=L, then the path per ring is approximately ⅓(L+b). The thermal conductance is determined by the number of rings and the dimensions of the rings and bridges. For example, if D=50 µm, then L=26.2 µm and therefore, conduction losses may be reduced to below radiation losses if the rings and bridges are 2 µm wide by 0.5 µm thick, b=3 µm and the number of rings=10. In this embodiment, the effective path length for the structure is 120 µm and the thermal conductance is approximately $8\times10^{-8}$ watt/K.

Figure 4:
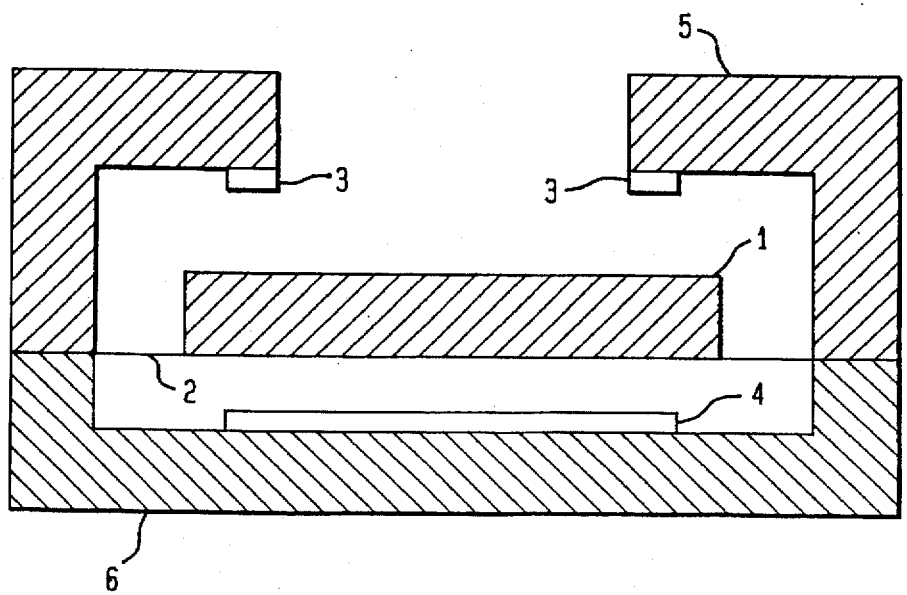
FIG. 4 illustrates another way in which to thermally isolate the microresonator according to the present invention.

Another way to thermally isolate the microresonator would be to support the resonator on thin film supports as shown in FIG. 4. As shown, a resonator wafer 1 is supported by thin film support(s) 2, which itself is supported by sandwiching the thin film supports between electrode wafers 3 and 4. The resonator wafer is excited in an electrodeless or BVA configuration by top electrodes 5 and bottom electrodes 6. Such electrodeless configurations are known in the art and have been described in such references as U.S. Pat. No. 3,339,091 issued to Hammond et al on Aug. 29, 1967 and Besson, "A New Electrodeless' Resonator Design," Proceedings of the 31$^{st}$ Annual Symposium on Frequency Control, pp. 147–152, 1997, both of which are incorporated herein by reference. An advantage of the electrodeless configuration is that direct electrical contacts to the resonator are not needed. Therefore, resonators supported by only mechanical contact are only limited by how thin and narrow the thin film supports can be. This thin film may, for example, be built up of monolayers, either self assembling or Langmuir-Blodgett films, of an infrared absorbing material. Another example of a thin film support is a masked pattern which is attached to one side of the resonator wafer wherein the masked pattern is a thin, low thermal conductance etch resist pattern such that when etching is completed the pattern serves as the mechanical connection to the electrodeless configuration described above. Another means of thermally isolating the microresonator is to use an aerogel support(s).

The present invention can be operated at any temperature up to just below the phase transition of the resonator material (or up to just below the melting point for materials without phase transitions). For example, when the resonator material is single crystal quartz, the sensor or sensor array can operate from cryogenic temperatures to near 573° C., the phase transition of quartz.

Although the present invention has been described utilizing a limited number of different embodiments, the inventor does not wish to be limited by such descriptions, but only by the appended claims.

What is claimed is:

1. A highly sensitive radiant energy sensor comprising:

a microresonator having an orientation and cut such that the microresonator has a frequency versus temperature characteristic which has a steep slope and is monotonic, wherein at least one major face of the microresonator is exposed to radiant energy;

means to electrically excite the microresonator to produce an output frequency such that changes in radiant energy incident to the microresonator vary the output frequency; and means to thermally isolate the microresonator, wherein the means to thermally isolate the microresonator includes a plurality of concentric low thermal conductance rings and a plurality of sets of bridges each set of bridges connecting and supporting a selected pair of concentric rings.

2. The radiant energy sensor of claim 1 wherein each set of bridges includes three bridges which are spaced apart by approximately 120°.

3. A highly sensitive radiant energy sensor comprising:

a microresonator having an orientation and cut such that the microresonator has a frequency versus temperature characteristic which has a steep slope and is monotonic, wherein at least one major face of the microresonator is exposed to radiant energy; and means to electrically excite the microresonator to produce an output frequency such that changes in radiant energy incident to the microresonator vary the output frequency, wherein the means to excite the microresonator includes thickness field electrodes in the shape of separated concentric rings which are disposed around the microresonator with interconnecting conductors electrically connecting and supporting the concentric rings.

* * * * *